United States Patent
Zhang et al.

(10) Patent No.: US 12,024,574 B2
(45) Date of Patent: Jul. 2, 2024

(54) LIGHT CURABLE (METH)ACRYLATE RESIN COMPOSITION FOR THERMOPLASTIC ELASTOMERS BONDING

(71) Applicant: Henkel AG & Co. KGaA, Duesseldorf (DE)

(72) Inventors: Heqiang Zhang, Shanghai (CN); Chongjian Song, Shanghai (CN); Zuohe Wang, Shanghai (CN); Chongyang Sun, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 147 days.

(21) Appl. No.: 17/444,616

(22) Filed: Aug. 6, 2021

(65) Prior Publication Data

US 2021/0371551 A1 Dec. 2, 2021

Related U.S. Application Data

(63) Continuation of application No. PCT/CN2019/074765, filed on Feb. 11, 2019.

(51) Int. Cl.
| | | |
|---|---|---|
| *C08F 2/50* | (2006.01) | |
| *C08F 210/10* | (2006.01) | |
| *C08F 220/18* | (2006.01) | |
| *C08J 5/12* | (2006.01) | |
| *C08K 5/07* | (2006.01) | |
| *C08K 5/5397* | (2006.01) | |

(52) U.S. Cl.
CPC .............. *C08F 2/50* (2013.01); *C08F 210/10* (2013.01); *C08F 220/1806* (2020.02); *C08F 220/1811* (2020.02); *C08J 5/124* (2013.01); *C08K 5/07* (2013.01); *C08K 5/5397* (2013.01)

(58) Field of Classification Search
None
See application file for complete search history.

(56) References Cited

U.S. PATENT DOCUMENTS

| | | | |
|---|---|---|---|
| 5,171,760 A * | 12/1992 | Kaszas | C08F 255/08 522/121 |
| 8,232,350 B2 * | 7/2012 | Fujita | C08L 23/22 525/193 |
| 9,676,928 B2 * | 6/2017 | Liu | C08L 23/20 |
| 10,141,532 B2 * | 11/2018 | Liu | C08L 23/20 |
| 10,611,932 B2 * | 4/2020 | Niimi | H01L 33/502 |
| 2010/0155247 A1 * | 6/2010 | Cao | C09K 3/10 522/158 |
| 2014/0190736 A1 * | 7/2014 | Cao | C09K 3/10 522/182 |
| 2015/0210882 A1 * | 7/2015 | Burdzy | C09D 133/08 277/316 |
| 2018/0241056 A1 | 8/2018 | Soga et al. | |
| 2021/0347930 A1 * | 11/2021 | Matsui | C08K 3/36 |

FOREIGN PATENT DOCUMENTS

| | | | | |
|---|---|---|---|---|
| CN | 107493684 A * | 12/2017 | | C08F 2/50 |
| CN | 107925098 A | 4/2018 | | |
| EP | 0353471 A2 * | 7/1989 | | C08F 255/08 |
| EP | 3330305 A1 * | 6/2018 | | B29C 65/70 |
| EP | 3340352 A1 | 6/2018 | | |
| EP | 3730562 A1 * | 10/2020 | | B32B 15/043 |
| JP | 2013216782 A | 10/2013 | | |
| WO | WO-2007111607 A1 * | 10/2007 | | C08L 21/00 |
| WO | 2012035958 A1 | 3/2012 | | |
| WO | WO-2016024618 A1 * | 2/2016 | | C08F 220/06 |

\* cited by examiner

*Primary Examiner* — Sanza L. McClendon
(74) *Attorney, Agent, or Firm* — Steven C. Bauman

(57) ABSTRACT

The present invention provides a light curable (meth)acrylate resin composition for thermoplastic elastomer bonding. The light curable (meth)acrylate resin composition of the present invention comprises: a (meth)acrylic monomer, a polyolefin (meth)acrylate oligomer having a viscosity of 200 000 to 2 500 000 mPa*s at 25° C., and a photoinitiator. The present invention also provides a cured product of the light curable (meth)acrylate resin composition and a use of the composition.

10 Claims, No Drawings

LIGHT CURABLE (METH)ACRYLATE RESIN COMPOSITION FOR THERMOPLASTIC ELASTOMERS BONDING

TECHNICAL FIELD

The present invention relates to a light curable (meth)acrylate resin composition for thermoplastic elastomers bonding. In particular, the present invention relates to a light curable (meth)acrylate resin composition comprising: a (meth)acrylic monomer, a polyolefin (meth)acrylate oligomer having a viscosity of 200 000 to 2 500 000 mPa*s at 25° C., and a photoinitiator.

BACKGROUND OF THE INVENTION

In 2014, the world market for thermoplastic elastomers (TPEs), which are a class of copolymers or a physical mix of polymers that consist of materials with both thermoplastic and elastomeric properties, reached a volume of ca. 16.7 billion US dollars. Thermoplastic elastomers show advantages typical of both rubbery materials and plastic materials. In particular, TPEs can be molded, extruded and reprocessed like plastics, and at the same time, they have typical elastic properties of conventional rubbers.

There are many varieties of thermoplastic elastomers, such as styrenic block copolymers, thermoplastic polyolefin elastomers, thermoplastic vulcanizate, thermoplastic polyurethanes, thermoplastic copolyester and thermoplastic polyamides. Depending on the environments, TPEs have outstanding thermal properties and material stability when exposed to a broad range of temperatures and non-polar materials; and they exhibit good colourability, and a useful balance of tensile and elongation properties. TPEs cover a broad range of technical applications ranging from automotive market to consumer and medical. In particular, they are widely used in medical device, such as blood collection sets, drug infusion sets and feeding tubes. However, they are hard to bonding. All the current light curable (meth)acrylate adhesives cannot provide an excellent bonding performance on TPEs. Moreover, without pretreatment on substrate surfaces, many current light curable (meth)acrylate adhesives for TPEs bonding show a poor adhesion.

There is a need to develop a light curable (meth)acrylate resin composition for thermoplastic elastomer bonding, which has an excellent performance of TPEs bonding. There is another need to develop a light curable (meth)acrylate resin composition for thermoplastic elastomer bonding, which shows a good adhesion without pre-treating substrate surfaces.

SUMMARY OF THE INVENTION

It is an object of the present invention to provide a light curable (meth)acrylate resin composition for thermoplastic elastomer bonding, which has an excellent performance of TPEs bonding. It is another object of the present invention to provide a light curable (meth)acrylate resin composition for thermoplastic elastomer bonding, which shows a good adhesion without pre-treating substrate surfaces.

The present invention provides a light curable (meth)acrylate resin composition, comprising
(a) a (meth)acrylic monomer,
(b) a polyolefin (meth)acrylate oligomer having a viscosity of 200 000 to 2 500 000 m Pa*s at 25° C., and
(c) a photoinitiator.

The present invention also provides a cured product of the light curable (meth)acrylate resin composition of the present invention.

The present invention further provides a method for producing the cured product of the present invention, comprising the following steps:
(i) providing the light curable (meth)acrylate resin composition of the present invention, and
(ii) exposing the light curable (meth)acrylate resin composition to light to obtain the cured product thereof.

Furthermore, the present invention provides a method of adhering components together, said method comprising:
(i) mating a first component having a light curable (meth)acrylate resin composition of the present invention applied thereto with a second component; and
(ii) curing the composition between the components to be adhered together.

Moreover, the present invention provides a use of the light curable (meth)acrylate resin composition of the present invention for thermoplastic elastomers bonding in medical device.

The light curable (meth)acrylate resin composition according to the present invention has an excellent performance of TPEs bonding, and/or shows a good adhesion without pre-treating substrate surfaces.

DETAILED DESCRIPTION OF THE INVENTION

It is to be understood by one of ordinary skill in the art that the present discussion is a description of exemplary embodiments only, and is not intended as limiting the broader aspects of the present invention. Each aspect so described may be combined with any other aspect or aspects unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, all wt % values quoted herein are percentages by weight based on total weight of the light curable (meth)acrylate resin composition.

Unless specified otherwise, as used herein, the singular forms "a", "an" and "the" include both singular and plural referents.

Unless specified otherwise, as used herein, "(meth)acrylate" refers to an acrylate and a corresponding methacrylate, and a (meth)acrylic compound refers to an acrylic and methacrylic compound.

Unless specified otherwise, as used herein, all the viscosity values are measured with Anton Paar MCR 102 rheometer using CP25-2 as a spindle rotating at 50 RPM according to BS 5350 Part B8:1990 (Methods of test for adhesives—Determination of viscosity) at 25 C.

The terms "comprising" and "comprises" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs.

According to the present invention, the light curable (meth)acrylate resin composition comprises:
(a) a (meth)acrylic monomer,
(b) a polyolefin (meth)acrylate oligomer having a viscosity of 200 000 to 2 500 000 mPa*s at 25° C., and
(c) a photoinitiator.

A (meth)acrylic Monomer

The light curable (meth)acrylate resin composition of the present invention comprises a (meth)acrylic monomer.

The (meth)acrylic monomer can be any (meth)acrylic monomer which can be used as a reactive diluent in conventional light curable (meth)acrylate resin compositions. Preferably, the (meth)acrylic monomer is selected from the group consisting of (meth)acrylic acid esters or (meth)acrylates.

Such a (meth)acrylate may be a monofunctional (meth)acrylate, such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 4-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, 2-(2-vinyloxyethoxy)ethyl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, flexible lactone-modified (meth)acrylate, t-butylcyclohexyl (meth)acrylate, dicyclopentenyl (meth)acrylate, dicyclopentenyloxyethyl (meth)acrylate, or isobornyl (meth)acrylate.

Bifunctional (meth)acrylates may be used, such as dipropylene glycol di(meth)acrylate, triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonane diol di(meth)acrylate, neopentyl glycol di(meth)acrylate, tricyclodecane dimethanol diacrylate, bisphenol A ethylene oxide adduct di(meth)acrylate, bisphenol A propylene oxide adduct di(meth)acrylate, hydroxypivalic acid neopentyl glycol di(meth)acrylate, and polytetramethylene glycol di(meth)acrylate.

The (meth)acrylate may be a trifunctional or more polyfunctional (meth)acrylate, such as trimethylolpropane tri(meth)acrylate, ethylene oxide-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritolethoxy tetra(meth)acrylate, or caprolactam-modified dipentaerythritol hexa(meth)acrylate.

Among these (meth)acrylates, preferably, the (meth)acrylic monomer is a monofunctional (meth)acrylate. More preferably, the (meth)acrylic monomer is selected from the group consisting of isobornyl (meth)acrylate, 3,3,5-trimethylcyclohexyl (meth)acrylate, lauryl (meth)acrylate, tetrahydrofurfuryl (meth)acrylate, octadecyl (meth)acrylate, isodecyl acrylate, trimethyl cyclohexyl acrylate, and combinations thereof. Preferably, the (meth)acrylic monomer is selected from the group consisting of isobornyl (meth)acrylate, 3,3,5-trimethylcyclohexyl (meth)acrylate and a combination thereof.

The (meth)acrylic monomer is present in an amount of 50 wt % to 90 wt %, and preferably 60 wt % to 75 wt %, based on the total weight of the light curable (meth)acrylate resin composition. If the content of the (meth)acrylic monomer is less than 50 wt %, the light curable (meth)acrylate resin composition would show poor adhesion on substrates and exhibit high viscosity. If the content of the (meth)acrylic monomer is more than 90 wt %, the light curable (meth)acrylate resin composition would show poor toughness and exhibit high viscosity.

(b) Polyolefin (meth)acrylate Oligomer Having a Viscosity of 200 000 to 2 500 000 mPa*s at 25° C.

The light curable (meth)acrylate resin composition of the present invention comprises a polyolefin (meth)acrylate oligomer having a viscosity of 200 000 to 2 500 000 mPa*s at 25° C. The viscosity of the polyolefin (meth)acrylate oligomer is preferably in the range of 1 000 000 to 2 000 000 mPa*s, and more preferably in the range of 1 400 000 to 1 800 000 m Pa*s, at 25° C.

Preferably, the polyolefin (meth)acrylate oligomer is an acryloyl-group-terminated polyisobutylene, such as KANEKA UV-curable polyisobutylene EP400V having the following structure, which is commercially available from KANEKA.

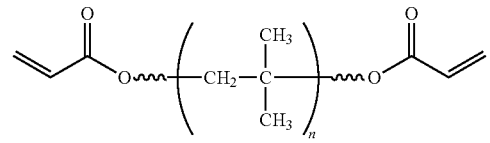

The polyolefin (meth)acrylate oligomer is present in an amount of 10 wt % to 40 wt %, and preferably 15 wt % to 35 wt %, based on the total weight of the light curable (meth)acrylate resin composition. If the content of the polyolefin (meth)acrylate oligomer is less than 10 wt %, the light curable (meth)acrylate resin composition would show poor toughness and exhibit low viscosity. If the content of the polyolefin (meth)acrylate oligomer is more than 40 wt %, the light curable (meth)acrylate resin composition would show poor adhesion on substrates and exhibit high viscosity.

Preferably, the light curable (meth)acrylate resin composition of the present invention comprises no polyurethane (meth)acrylate oligomer.

Preferably, the weight ratio of the (meth)acrylic monomer to the polyolefin (meth)acrylate oligomer is in the range of from 6:1 to 1:1, preferably from 4:1 to 1.5:1.

(c) Photoinitiator

According to the present invention, the light curable (meth)acrylate resin composition comprises a photoinitiator.

A photoinitiator is a compound that undergoes a photoreaction on absorption of light, producing reactive species. The reactive species which are generated then initiate polymerization of the reactive components of the curable composition.

Suitable photoinitiators include, for example, alpha-hydroxy ketones, phenylglyoxylates, benzyldimethylketals, alpha-aminoketones, mono-acyl phosphines, bis-acyl phosphines, metallocenes, phosphine oxides, benzoin ethers and benzophenones and combinations thereof. Preferably, the photoinitiator according to the present invention is selected from the group consisting of alpha-hydroxy ketones, phosphine oxides and combinations thereof.

Specific examples of suitable photoinitiators include, but are not limited to, 2-methylanthraquinone, 2-ethylanthraquinone, 2-chloroanthraquinone, 2-benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2-diethyloxyacetophenone, diethyloxyacetophenone, 2-isopropylthioxanthone, thioxanthone, diethyl thioxanthone, acetylnaphthalenes, ethyl-p-dimethylaminobenzoate, benzil ketone, α-hydroxy ketone, 2,4,6-trimethylbenzoyldiphenyl phosphinoxide, benzyl dimethyl ketal, benzil ketal (2,2-dimethoxy-1,2-diphenylethanone), 1-hydroxycyclohexyl phenyl ketone, 2-methyl-1-[4-(methylthio)phenyl]-2-morpholinopropanone-1,2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphosphine oxide, phenyl bis(2,4,6-trimethyl benzoyl) phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene) cyclopentadienyl iron(ii) hexafluorophosphate, 9,10-diethoxy and 9,10-dibutoxyanthracene, 2-ethyl-9,10-dimethoxyanthracene, thioxanthene-9-one and combinations thereof. Preferably, the photoinitiator according to the present invention is selected from the group consisting of 1-hydroxycyclohexyl phenyl ketone, diphenyl (2,4,6-trimethylbenzoyl) phosphine oxide and the combination thereof.

Exemplary combinations of suitable photoinitiators include blends of 2-hydroxy-2-methyl-1-phenyl-1-propanone, 2,4,6-trimethylbenzoylphenylphosphinic acid ethyl ester and phenylbis(2,4,6-trimethylbenzoyl)phosphine oxide, blends of 2-hydroxy-2-methyl-1-phenyl-1-propanone and diphenyl (2,4,6-trimethylbenzoyl) phosphine oxide, and blends of 1-hydroxycyclohexyl phenyl ketone and diphenyl (2,4,6-trimethylbenzoyl) phosphine oxide. Preferably, the photoinitiator according to the present invention is a blend of 1-hydroxycyclohexyl phenyl ketone and diphenyl (2,4,6-trimethylbenzoyl) phosphine oxide. More preferably, the weight ratio of 1-hydroxycyclohexyl phenyl ketone to diphenyl (2,4,6-trimethylbenzoyl) phosphine oxide is in the range of 1:10 to 10:1, preferably 1:8 to 8:1.

The photoinitiator is present in an amount of 1 wt % to 15 wt %, preferably from 1 wt % to 8 wt %, based on the total weight of the light curable (meth)acrylate resin composition.

Optional Components

The light curable (meth)acrylate resin composition according to the present invention may be formulated to contain one or more additional components or additives besides those described above. For example, the light curable (meth)acrylate resin composition may additionally comprise at least one of: fluorescent additive, fillers (e.g., inorganic fillers, such as particulate inorganic fillers, including clays, organoclays, calcium carbonate, montmorillonite, silica and other silicon oxides, alumina and other aluminum oxides, titanium oxides, dolomite, talc, mica and the like), pigments/dyes, adhesion promotors, stabilizers, antioxidants, thickeners (thixotropes), rheology control agents, levelling agents, and combinations thereof. Preferably, the light curable (meth)acrylate resin composition further comprises an additive selected from the group consisting of a fluorescent additive, a filler, a pigment/dye, an adhesion promotor and combinations thereof, more preferably a fluorescent additive, an adhesion promotor and combinations thereof. More preferably, the light curable (meth)acrylate resin composition according to the present invention contains a fluorescent additive and an adhesion promotor.

Examples of the fluorescent additive include, but are not limited to, naphthalene benzoxazoyl derivatives, thiophene benzoxazoyl derivative, stryrene biphenyl derivatives, pyrazolone derivates, stilbene derivatives, styryl derivatives of benzene and biphenyl, bis(benzazol-2-yl) derivatives, carbostyryl, naphthalimide, dibenzothiophene-5,5'-dioxide derivatives, pyrene derivatives, and pyridotriazole. These may be used singly or in combination. Preferably, a thiophene benzoxazoyl derivative is used as the fluorescent additive. For example, 2,5-thiophenediyl bis(5-tert-butyl-1,3-benzoxazole) can be available as TINOPAL OB from BASF. The fluorescent additive content in the light curable (meth)acrylate resin composition is preferably in the range of 0.01 wt % to 0.50 wt %, based on the total weight of the light curable (meth)acrylate resin composition.

Examples of the adhesion promotor include, but are not limited to, γ-glycidoxypropyltrimethoxysilane, γ-methacryloxypropyltrimethoxysilane, γ-methacryloxypropylmethyldimethoxysilane, 3-acryloxypropyltrimethoxysilane, vinyltrimethoxysilane, vinyltriethoxysilane, p-styryltrimethoxysilane, 2-(3.4-epoxycyclohexyl)ethyltrimethoxysilane, γ-glycidoxypropylmethyldimethoxysilane, 3-glycidoxypropylmethyldiethoxysilane, γ-aminopropyltrimethoxysilane, 3-aminopropyltriethoxysilane, N-2(aminoethyl) 3-amino-propylmethyldimethoxysilane, N-2(aminoethyl) 3-amino-propyltrimethoxysilane, N-2(aminoethyl) 3-aminopropyltriethoxysilane, 3-mercaptopropylmethyldimetoxysilane and 3-mercaptopropyltrimethoxysilane. These may be used singly or in combination. Preferably, the adhesion promotor is γ-glycidoxypropyltrimethoxysilane.

The pigment used in the light curable (meth)acrylate resin compositions according to the present invention may be selected from inorganic pigments or organic pigments.

Inorganic pigments that can be used in the present embodiment include carbon blacks, such as furnace black, lampblack, acetylene black, channel black and titanium black (for example, C.I. Pigment Black 7 and Degussa SPECIAL BLACK 250). Iron oxide and titanium oxide may be used.

Exemplary organic pigments include insoluble azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

Any dye, such as acid dyes, direct dyes, reactive dyes, and basic dyes, may be used without particular limitation. Exemplary dyes include C.I. Acid Yellows 17, 23, 42, 44, 79 and 142, C.I. Acid Reds 52, 80, 82, 249, 254 and 289, C.I. Acid Blues 9, 45 and 249, C.I. Acid Blacks 1, 2, 24 and 94, C.I. Food Blacks 1 and 2, C.I. Direct Yellows 1, 12, 24, 33, 50, 55, 58, 86, 132, 142, 144 and 173, C.I. Direct Reds 1, 4, 9, 80, 81, 225 and 227, C.I. Direct Blues 1, 2, 15, 71, 86, 87, 98, 165, 199 and 202, C.I. Direct Blacks 19, 38, 51, 71, 154, 168, 171 and 195, and C.I. Reactive Reds 14, 32, 55, 79 and 249, and C.I. Reactive Blacks 3, 4 and 35.

The light curable (meth)acrylate resin composition according to the present invention can be made by any appropriate method. For example, the composition can be made by mixing all the components therein except component (b) and then adding component (b).

The light curable (meth)acrylate resin composition according to the present invention has an excellent performance of TPEs bonding, and shows a good adhesion without pre-treating substrate surfaces.

In a preferred embodiment, the light curable (meth) acrylate resin composition according to the present invention comprises:
(a) a (meth)acrylic monomer,
(b) a polyolefin (meth)acrylate oligomer having a viscosity of 200 000 to 2 500 000 mPa*s at 25° C.,
(c) a photoinitiator,
a fluorescent additive, and
an adhesion promotor.

In another preferred embodiment, the light curable (meth)acrylate resin composition according to the present invention comprises:
(a) 50 wt % to 90 wt % of a (meth)acrylic monomer,
(b) 10 wt % to 40 wt % of a polyolefin (meth)acrylate oligomer having a viscosity of 200 000 to 2 500 000 m Pes at 25° C.,
(c) 1 wt % to 15 wt % of a photoinitiator,
wt % to 0.50 wt % of a fluorescent additive, and
wt % to 5 wt % of an adhesion promotor,
based on the total weight of the light curable (meth) acrylate resin composition.

In a still another preferred embodiment, the light curable (meth)acrylate resin composition according to the present invention comprises:
(a) isobornyl (meth)acrylate or 3,3,5-trim ethylcyclohexyl (meth)acrylate,
(b) an acryloyl-group-terminated polyisobutylene,
(c) 1-hydroxycyclohexyl phenyl ketone and/or diphenyl (2,4,6-trimethylbenzoyl) phosphine oxide,
2,5-thiophenediyl bis(5-tert-butyl-1,3-benzoxazole), and
γ-glycidoxypropyltrimethoxysilane.

In a further preferred embodiment, the light curable (meth)acrylate resin composition according to the present invention comprises:
(a) isobornyl (meth)acrylate,
(b) an acryloyl-group-terminated polyisobutylene,
(c) 1-hydroxycyclohexyl phenyl ketone and diphenyl (2,4,6-trimethylbenzoyl) phosphine oxide,
2,5-thiophenediyl bis(5-tert-butyl-1,3-benzoxazole), and
γ-glycidoxypropyltrimethoxysilane.

In a still another preferred embodiment, the light curable (meth)acrylate resin composition according to the present invention comprises:
(a) 50 wt % to 90 wt % of isobornyl (meth)acrylate or 3,3,5-trim ethylcyclohexyl (meth)acrylate,
(b) 10 wt % to 40 wt % of an acryloyl-group-terminated polyisobutylene,
(c) 1 wt % to 15 wt % of 1-hydroxycyclohexyl phenyl ketone and/or diphenyl (2,4,6-trimethylbenzoyl) phosphine oxide,
wt % to 0.50 wt % of 2,5-thiophenediyl bis(5-tert-butyl-1,3-benzoxazole), and
wt % to 5 wt % of γ-glycidoxypropyltrimethoxysilane,
based on the total weight of the light curable (meth) acrylate resin composition.

The light curable (meth)acrylate resin composition of the present invention may be a product selected from the group consisting of an adhesive, a sealant and a coating.

The present invention also provides a cured product of the light curable (meth)acrylate resin composition of the present invention. Accordingly, in a further aspect, the present invention provides a method for producing the cured product of the present invention, the method comprising the following steps:
(i) providing the light curable (meth)acrylate resin composition according to the present invention, and
(ii) exposing the light curable (meth)acrylate resin composition to light to obtain the cured product thereof.

Furthermore, the present invention provides a method of adhering components together, said method comprising:
(i) mating a first component having a light curable (meth) acrylate resin composition according to the present invention applied thereto with a second component; and
(ii) curing the composition between the components to be adhered together.

Conditions sufficient to cure the light curable (meth) acrylate resin composition of the present invention may include radiation, e.g., UV radiation. Preferably, the light curable (meth)acrylate resin composition of the present invention may by cured in air by irradiation with UV light in the range from 200 to 600 nm, preferably from 360 to 410 nm, more preferably from 365 to 395 nm.

The UV radiation used to cure the inventive composition may be generated from a variety of UV light sources, such as UV LED, carbon arcs, mercury-vapor arcs, fluorescent lamps with special ultraviolet light emitting phosphors, electronic flash lamps and the like, lasers of specific wavelengths, or combinations of those.

The light curable (meth)acrylate resin composition of the present invention may find utility in bonding, sealing or coating a plurality of substrates and/or surfaces. In particular, the light curable (meth)acrylate resin composition of the present invention may be used for thermoplastic elastomers bonding in medical device, such as blood collection sets, drug infusion sets and feeding tubes.

The following examples are intended to assist one skilled in the art to better understand and practice the present invention. The scope of the invention is not limited by the examples but is defined in the appended claims. All parts and percentages are based on weight unless otherwise stated.

EXAMPLES

The materials as shown in Table 1 were used in the examples.

TABLE 1

| Material | Trade Name | Supplier |
|---|---|---|
| Isobornyl acrylate | SR 506 | Sartomer |
| 3,3,5-trimethylcyclohexyl (meth)acrylate | SR 420 | Sartomer |
| acryloyl-group-terminated polyisobutylene | Epion EP400V | Kaneka |
| diphenyl (2,4,6-trimethylbenzoyl) phosphine oxide | Chivacure TPO | Chitec Chemical |
| 1-hydroxycyclohexyl phenyl ketone | Irgacure 184 | BASF |
| 2,5-thiophenediyl bis(5-tert-butyl-1,3-benzoxazole) | Tinopal OB CO | BASF |
| γ-glycidoxypropyltrimethoxysilane | Silquest A 187 | Momentive Performance Materials |
| Aliphatic polyester urethane diacrylate | BR-7432GB | Dymax Oligomers & Coatings |
| Aliphatic polyether urethane acrylate | BR-3641AJ | Dymax Oligomers & Coatings |
| Polybutadiene urethane acrylate | KUA-336 | Kayaku Chemical Wuxi |

Inventive Examples 1-5 and Comparative Examples 1-5

Inventive Example 1

4.0 g of Chivacure TPO, 0.02 g of Tinopal OB CO, 0.8 g of Irgacure 184, 1.0 g of Silquest A 187 and 72.18 g of SR 506 were charged into a mixing cup, and the resultant liquid was stirred evenly. Then, 22.00 g of Epion EP400V was added into the mixing cup, and the resultant mixture was stirred evenly.

Inventive Example 2

4.0 g of Chivacure TPO, 0.02 g of Tinopal OB CO, 0.8 g of Irgacure 184, 1.0 g of Silquest A 187 and 72.18 g of SR 420 were charged into a mixing cup, and the resultant liquid was stirred evenly. Then, 22.00 g of Epion EP400V was added into the mixing cup, and the resultant mixture was stirred evenly.

Inventive Example 3

4.0 g of Chivacure TPO, 0.02 g of Tinopal OB CO, 0.8 g of Irgacure 184, 1.0 g of Silquest A 187 and 80 g of SR 506 were charged into a mixing cup, and the resultant liquid was stirred evenly. Then, 14.18 g of Epion EP400V was added into the mixing cup, and the resultant mixture was stirred evenly.

Inventive Example 4

4.0 g of Chivacure TPO, 0.02 g of Tinopal OB CO, 0.8 g of Irgacure 184, 1.0 g of Silquest A 187 and 62.18 g of SR 506 were charged into a mixing cup, and the resultant liquid was stirred evenly. Then, 32 g of Epion EP400V was added into the mixing cup, and the resultant mixture was stirred evenly.

Inventive Example 5

4.0 g of Chivacure TPO, 0.02 g of Tinopal OB CO, 0.8 g of Irgacure 184, 1.0 g of Silquest A 187 and 54.18 g of SR 506 were charged into a mixing cup, and the resultant liquid was stirred evenly. Then, 40 g of Epion EP400V was added into the mixing cup, and the resultant mixture was stirred evenly.

Comparative Example 1

4.0 g of Chivacure TPO, 0.02 g of Tinopal OB CO, 0.8 g of Irgacure 184, 1.0 g of Silquest A 187 and 72.18 g of SR 506 were charged into a mixing cup, and the resultant liquid was stirred evenly. Then, 22.00 g of BR-7432 GB was added into the mixing cup, and the resultant mixture was stirred evenly.

Comparative Example 2

4.0 g of Chivacure TPO, 0.02 g of Tinopal OB CO, 0.8 g of Irgacure 184, 1.0 g of Silquest A 187 and 72.18 g of SR 420 were charged into a mixing cup, and the resultant liquid was stirred evenly. Then, 22.00 g of BR-7432 GB was added into the mixing cup, and the resultant mixture was stirred evenly.

Comparative Example 3

4.0 g of Chivacure TPO, 0.02 g of Tinopal OB CO, 0.8 g of Irgacure 184, 1.0 g of Silquest A 187 and 72.18 g of SR 420 were charged into a mixing cup, and the resultant liquid was stirred evenly. Then, 22.00 g of BR-3641AJ was added into the mixing cup, and the resultant mixture was stirred evenly.

Comparative Example 4

4.0 g of Chivacure TPO, 0.02 g of Tinopal OB CO, 0.8 g of Irgacure 184, 1.0 g of Silquest A 187 and 72.18 g of SR 506 were charged into a mixing cup, and the resultant liquid was stirred evenly. Then, 22.00 g of BR-3641AJ was added into the mixing cup, and the resultant mixture was stirred evenly.

Comparative Example 5

4.0 g of Chivacure TPO, 0.02 g of Tinopal OB CO, 0.8 g of Irgacure 184, 1.0 g of Silquest A 187 and 72.18 g of SR 506 were charged into a mixing cup, and the resultant liquid was stirred evenly. Then, 22.00 g of KUA-336 was added into the mixing cup, and the resultant mixture was stirred evenly.

Evaluation:

A. Influence of the Type of (meth)acrylate Oligomer on the Light Curable (meth)acrylate Resin Composition To illustrate the influence of the type of (meth)acrylate oligomer on the light curable (meth)acrylate resin composition, Inventive Examples 1-2 and Comparative Examples 1-4 were used, and the components and its amounts of their composition are shown in Table 2, respectively.

TABLE 2

| | | Inventive Example 1 | Inventive Example 2 | Comparative Example 1 | Comparative Example 2 | Comparative Example 3 | Comparative Example 4 |
|---|---|---|---|---|---|---|---|
| Component (a) | SR 506 | 72.18 g | | 72.18 g | | | 72.18 g |
| | SR 420 | | 72.18 g | | 72.18 g | 72.18 g | |
| Component (b) | Epion EP400V | 22 g | 22 g | | | | |
| | BR-7432GB | | | 22 g | 22 g | | |
| | BR-3641AJ | | | | | 22 g | 22 g |
| Component (c) | Chivacure TPO | 4 g | 4 g | 4 g | 4 g | 4 g | 4 g |
| | Irgacure 184 | 0.8 g | 0.8 g | 0.8 g | 0.8 g | 0.8 g | 0.8 g |
| | Tinopal OB CO | 0.02 g | 0.02 g | 0.02 g | 0.02 g | 0.02 g | 0.02 g |
| | Silquest A 187 | 1.00 g | 1.00 g | 1.00 g | 1.00 g | 1.00 g | 1.00 g |
| SUM | | 100 g | 100 g | 100 g | 100 g | 100 g | 100 g |

The tensile lap-shear strengths of bonded assemblies for each composition were measured according to ISO 4587: 2003 at a speed of 200 mm/min using the following substrates and equipment under the following conditions:

Test substrates to be bonded:
  MD-12372, a TPE, commercially available from Teknor Apex;
  G2705N, a TPE, commercially available from Polyone;
  CL2242, a TPE, commercially available from Polyone; and
  PVC, a soft PVC, commercially available from Baiside.
Test Equipment: Instron universal test machine, Instron 1 KN Load Cell, air-actuated jaw
Test condition: 23° C., 50%
Test method:
1. The block assembly method was selected from ISO 4587: 2003. The lap-shear was assembled with a designed fixture to make sure the overlap area is about 12.7 mm×25.4 mm without thickness control.
2. Assembled parts were exposed to 405 nm LED flood system made by Henkel for full curing (30 s@500 mW).
3. Put the assembled part in the RT condition (23° C., 50%) for 24 hours.
4. Place the assembled parts in the grips of the testing machine (Instron universal test machine, Instron 1 KN Load Cell) so that the outer 25.4 mm of each end are grasped by the air-actuated jaws and so that the long axis of the test specimen coincides with the direction of applied tensile force through the center line of the grip assembly.
5. Test the assembly at a crosshead speed of 200.0 mm/min until the assembly can no longer support a load.
6. Record the load at failure.

The tensile lap-shear strength values for each composition were shown in Table 3.

From the tensile lap-shear strength values in Table 3, it can be seen that the compositions comprising Epion EP400V according to the present invention (i.e. Inventive Examples 1 and 2) have higher tensile lap-shear strength values than the composition comprising BR-3641AJ (i.e. Comparative Examples 3 and 4), whereas the components in the composition comprising BR-7432 GB (i.e. Comparative Examples 1 and 2) are not compatible. Therefore, it is illustrated that the light curable (meth)acrylate resin compositions comprising polyolefin (meth)acrylate oligomer according to the present invention have better performance of TPEs bonding than those comprising other types of (meth)acrylate oligomer, especially polyester urethane acrylates or polyether urethane acrylates.

B. Influence of the Viscosity of Polyolefin (meth)acrylate Oligomer on the Light Curable (meth)acrylate Resin Composition The viscosity of Epion EP400V and KUA-336 was measured by Anton Paar MCR 102 rheometer using CP25-2 as a spindle rotating at 50 RPM according to BS 5350 Part B8:1990 (Methods of test for adhesives-Determination of viscosity) at 25° C.

The measured viscosity value of Epion EP400V was 1592308 mPa*s, and the measured viscosity value of KUA-336 was 71050 mPa*s.

To illustrate the influence of the viscosity of polyolefin (meth)acrylate oligomer on the light curable (meth)acrylate resin composition, Inventive Example 1 and Comparative Example 5 were used, and the components and its amounts of their composition are shown in Table 4, respectively.

TABLE 3

| | Inventive Example 1 | Inventive Example 2 | Comparative Example 1 | Comparative Example 2 | Comparative Example 3 | Comparative Example 4 |
|---|---|---|---|---|---|---|
| CL2242-PVC | 0.55 Mpa | 0.48 Mpa | —* | —* | 0.37 Mpa | 0.28 Mpa |
| MD-12372-PVC | 0.71 Mpa | 0.62 Mpa | —* | —* | 0.56 Mpa | 0.43 Mpa |
| G2705-PVC | 0.53 Mpa | 0.52 Mpa | —* | —* | 0.44 Mpa | 0.35 pa |

*The components in the composition were not compatible, and thus, the tensile lap-shear strength values for the compositions are not measurable.

TABLE 4

|  |  | Inventive Example 1 | Comparative Example 5 |
|---|---|---|---|
| Component (a) | SR 506 | 72.18 g | 72.18 g |
| Component (b) | Epion EP400V | 22 g |  |
|  | KUA-336 |  | 22 g |
| Component (c) | Chivacure TPO | 4 g | 4 g |
|  | Irgacure 184 | 0.8 g | 0.8 g |
|  | Tinopal OB CO | 0.02 g | 0.02 g |
|  | Silquest A 187 | 1.00 g | 1.00 g |
| SUM |  | 100 g | 100 g |

The tensile lap-shear strengths of bonded assemblies for each composition were measured according to the method exactly the same as that used in Part A.

The tensile lap-shear strength values for each composition were shown in Table 5.

TABLE 5

|  | Inventive Example 1 | Comparative Example 5 |
|---|---|---|
| CL2242-PVC | 0.55 Mpa | 0.37 Mpa |
| MD-12372-PVC | 0.71 Mpa | 0.49 Mpa |
| G2705-PVC | 0.53 Mpa | 0.38 Mpa |

From the tensile lap-shear strength values in Table 5, it can be seen that the composition comprising Epion EP400V having a viscosity of 1592308 mPa*s according to the present invention (i.e. Inventive Example 1) has much higher tensile lap-shear strength values than the composition comprising KUA-336 having a viscosity of 71050 mPa*s (i.e. Comparative Example 5). Therefore, it is illustrated that the light curable (meth)acrylate resin compositions comprising a polyolefin (meth)acrylate oligomer having a viscosity of 200 000 to 2 500 000 mPa*s according to the present invention have better performance of TPEs bonding than those comprising a polyolefin (meth)acrylate oligomer having a viscosity which does not fall within the range of 200 000 to 2 500 000 mPa*s.

C. Different Contents of Component (a) and Contents of Component (b) in the Light Curable (meth)acrylate Resin Composition To illustrate different contents of component (a) and contents of component (b) in the light curable (meth)acrylate resin composition of the present invention, Inventive Examples 1 and 3-5 were used, and the components and its amounts of their composition are shown in Table 6, respectively.

TABLE 6

|  |  | Inventive Example 1 | Inventive Example 3 | Inventive Example 4 | Inventive Example 5 |
|---|---|---|---|---|---|
| Component (a) | SR 506 | 72.18 g | 80 g | 62.18 g | 54.18 g |
| Component (b) | Epion EP400V | 22 g | 14.18 g | 32 g | 40 g |
| Component (c) | Chivacure TPO | 4 g | 4 g | 4 g | 4 g |
|  | Irgacure 184 | 0.8 g | 0.8 g | 0.8 g | 0.8 g |

TABLE 6-continued

|  |  | Inventive Example 1 | Inventive Example 3 | Inventive Example 4 | Inventive Example 5 |
|---|---|---|---|---|---|
|  | Tinopal OB CO | 0.02 g | 0.02 g | 0.02 g | 0.02 g |
|  | Silquest A 187 | 1.00 g | 1.00 g | 1.00 g | 1.00 g |
| SUM |  | 100 g | 100 g | 100 g | 100 g |

The tensile lap-shear strengths of bonded assemblies for each composition were measured according to the method exactly the same as that used in Part A.

The tensile lap-shear strength values for each composition were shown in Table 7.

TABLE 7

|  | Inventive Example 1 | Inventive Example 3 | Inventive Example 4 | Inventive Example 5 |
|---|---|---|---|---|
| CL2242-PVC | 0.55 Mpa | 0.47 Mpa | 0.54 Mpa | 0.46 Mpa |
| MD-12372-PVC | 0.71 Mpa | 0.56 Mpa | 0.64 Mpa | 0.62 Mpa |
| G2705-PVC | 0.53 Mpa | 0.51 Mpa | 0.53 Mpa | 0.5 Mpa |

From the tensile lap-shear strength values in Table 7, it can be seen that all the compositions comprising 50 wt % to 90 wt % of SR 506 according to the present invention have high tensile lap-shear strength values, all the compositions comprising 10 wt % to 40 wt % of Epion EP400V according to the present invention have high tensile lap-shear strength values, and all the compositions according to the present invention wherein the weight ratio of SR 506 to Epion EP400V is within the range of 6:1 to 1:1 have high tensile lap-shear strength values. Therefore, it is illustrated that the light curable (meth)acrylate resin composition according to the present invention preferably comprises 50 wt % to 90 wt % of component (a), the light curable (meth)acrylate resin composition according to the present invention preferably comprises 10 wt % to 40 wt % of component (b), and in the light curable (meth)acrylate resin composition according to the present invention, the weight ratio of component (a) to component (b) is preferably in the range of 6:1 to 1:1.

Furthermore, from the tensile lap-shear strength values in Table 7, it is illustrated that the light curable (meth)acrylate resin composition according to the present invention more preferably comprises 60 wt % to 75 wt % of component (a), the light curable (meth)acrylate resin composition according to the present invention more preferably comprises 15 wt % to 35 wt % of component (b), and in the light curable (meth)acrylate resin composition according to the present invention, the weight ratio of component (a) to component (b) is more preferably in the range of 4:1 to 1.5:1.

D. Application of the Light Curable (meth)acrylate Resin Composition without Pre-Treating Substrate Surfaces To illustrate that the application of the light curable (meth)acrylate resin composition does not require pre-treatment of substrate surfaces, Inventive Examples 1-2 and the prior art adhesives Loctite AA 3951, Loctite 4011, and Loctite 4310, all of which are commercially available from Henkel, were used. The tensile lap-shear strengths of bonded assemblies for each composition or adhesive were measured according to the method exactly the same as that used in Part A.

The tensile lap-shear strength values for each composition or adhesive were shown in Table 8.

TABLE 8

|  | Inventive Example 1 | Inventive Example 2 | Loctite AA 3951 | Loctite 4011 | Loctite 4310 |
|---|---|---|---|---|---|
| MD12372-PVC | 0.71 Mpa | 0.62 Mpa | 0.33 Mpa | 0.28 Mpa | 0.25 pa |

From the tensile lap-shear strength values in Table 8, it can be seen that without any treatment to substrate, the light curable (meth)acrylate resin compositions according to the present invention (i.e. Inventive Examples 1 and 2) have much higher tensile lap-shear strength values than the prior art adhesives Loctite AA 3951, Loctite 4011, and Loctite 4310. Therefore, it is illustrated that the light curable (meth) acrylate resin compositions according to the present invention show good adhesion without pre-treating substrate surfaces.

To sum up, the light curable (meth)acrylate resin composition according to the present invention has an excellent performance of TPEs bonding, and/or shows a good adhesion without pre-treating substrate surfaces.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A light curable (meth)acrylate resin composition comprising,
    (a) a (meth)acrylic monomer selected from the group consisting of isobornyl (meth)acrylate, 3,3,5-trimethylcyclohexyl (meth)acrylate, lauryl (meth)acrylate, tetrahydrofurfuryl (meth)acrylate, octadecyl (meth)acrylate, isodecyl acrylate, trimethyl cyclohexyl acrylate, and combinations thereof,
    (b) an acryloyl-group-terminated polyisobutylene having a viscosity of 200 000 to 2 500 000 mPa*s,
    (c) a photoinitiator selected from the group consisting of alpha-hydroxy ketones, phosphine oxides and combinations thereof, and
    (d) 2,5-thiophenediyl bis(5-tert-butyl-1,3-benzoxazole, wherein the composition comprises no polyurethane (meth)acrylate monomer.

2. A light curable (meth)acrylate resin composition, comprising
    (a) a (meth)acrylic monomer,
    (b) an acryloyl-group-terminated polyisobutylene having a viscosity of 200 000 to 2 500 000 mPa*s, and
    (c) a photoinitiator,
wherein the content of the component (a) is from 50 wt % to 90 wt %, based on the total weight of the light curable (meth)acrylate resin composition, and the content of component (b) is from 10 wt % to 40 wt %, based on the total weight of the light curable (meth)acrylate resin composition.

3. The light curable (meth)acrylate resin composition according to claim 2, wherein the weight ratio of component (a) to component (b) is in the range of from 6:1 to 1:1.

4. The light curable (meth)acrylate resin composition according to claim 2, wherein the content of the component (c) is from 1% to 15% by weight, based on the total weight of the light curable (meth)acrylate resin composition.

5. The light curable (meth)acrylate resin composition according to claim 2, further comprising an additive selected from the group consisting of a fluorescent additive, a filler, a pigment/dye, an adhesion promotor and combinations thereof.

6. The light curable (meth)acrylate resin composition according to claim 1, wherein the composition is an adhesive, sealant or coating.

7. A cured product of the light curable (meth)acrylate resin composition of claim 1.

8. A method for producing the cured product of claim 7, comprising the following steps:
    (i) providing the light curable (meth)acrylate resin composition, and
    (ii) exposing the light curable (meth)acrylate resin composition to light to obtain the cured product thereof.

9. A method of adhering components together, said method comprising:
    (i) mating a first component having a light curable (meth)acrylate resin composition according to claim 1 applied thereto with a second component; and
    (ii) curing the composition between the components to be adhered together.

10. A light curable (meth)acrylate resin composition according to claim 1 for thermoplastic elastomers bonding of a medical device.

* * * * *